United States Patent [19]

Sellers et al.

[11] Patent Number: 5,357,609
[45] Date of Patent: Oct. 18, 1994

[54] SITE CONTROLLER WITH ECHO SUPPRESSION

[75] Inventors: Robert E. Sellers, Santa Clara; Gary D. Alford, Campbell, both of Calif.

[73] Assignee: One Touch Systems, Inc., Santa Clara, Calif.

[21] Appl. No.: 858,319

[22] Filed: Mar. 25, 1992

[51] Int. Cl.⁵ ............................................. G06F 13/38
[52] U.S. Cl. .................................. 395/200; 370/32.1
[58] Field of Search ....................... 370/32.1, 410, 406; 395/200; 379/410

[56] References Cited

U.S. PATENT DOCUMENTS

4,064,379 12/1977 Horna .............................. 179/170.2
4,542,265 9/1985 Brady .............................. 179/170.2

Primary Examiner—Robert L. Richardson
Attorney, Agent, or Firm—Thomas E. Schatzel

[57] ABSTRACT

An embodiment of the present invention is a site controller that comprises a microcomputer with a RAM for main memory and an EPROM for program memory, an interface for accepting RS-485 data and voice communication on respective differential wire pairs from a daisy chain of student response keypad terminals, a public telephone data access arrangement with hybrid for sending and receiving voice over a dial-up line, a universal asynchronous receiver-transmitter for data communication by modem with a remote host site via an X.25 PAD and an audio processor for half-duplex communication between an instructor and a student that has voltage controlled amplifiers and side chain devices that reduce audio amplifier gain during periods of silence in order to eliminate feedback howl and adjustable delay and threshold devices for gating the respective channels through in the half-duplex mode.

4 Claims, 6 Drawing Sheets

SITE CONTROLLER WITH ECHO SUPPRESSION

CROSS-REFERENCE TO RELATED APPLICATIONS

DAISY CHAINABLE VOICE-DATA TERMINAL, Ser. No. 07/858,319, filed Mar. 25, 1992, inventors Gary D. ALFORD and Robert E. SELLERS, assigned to assignee of the present invention; and COMPUTER IMPLEMENTED METHOD AND APPARATUS FOR REMOTE EDUCATIONAL INSTRUCTION, Ser No. 07/858,321, filed Mar. 25, 1992, inventors Howard Stephen LEWIS, et al., assigned to assignee of the present invention.

BACKGROUND OF THE INVENTION

1. Field of the Invention

The invention relates generally to computer-based remote communications systems and specifically to site controllers for user keypad terminals with digital logic and microphone pickups that can be strung in a daisy chain of identical terminals.

2. Description of the Prior Art

Technology, in its various forms, has allowed the instructional classroom to be extended beyond the traditional campus to remote student locations by telecommunications. Community colleges have been offering telecourses for academic credit nationwide for at least the last ten years. Students in their homes may tune into tape recorded video series that are broadcast by PBS TV stations at regular times. Then, two or three times a semester, the telecourse students may meet on campus to take mid-term and final examinations. Usually a regular instructor has responsibility for conducting the tests and helping enrolled students during the progress of each telecourse. Currently, lower division undergraduate credit can be earned in this way in oceanography, geology, mathematics, business, and marketing, to name a few. Successful students learning with this form of instruction do so in spite of a lack of close contact with an instructor and sacrifice the ability to ask questions during lectures. One advantage is that telecourses are relatively inexpensive for all those involved because the local community college merely synchronizes itself with the schedule decided by a local PBS TV station that typically serves a region comprising several community college districts. The television station bears the expense of studio and transmitter equipment and the software when a video tape is provided in a syndication. The students need only to tune in a television receiver he or she may already own.

Businesses very often find it easier to cover the cost of more exotic teleconferencing and teleinstruction to conduct conferences and instructional sessions. Teleconferencing permits two-way picture and sound communications with the participants, but is much more expensive than ordinary telephone conferencing since special purpose video equipment and a video grade channel are needed to interconnect the parties. Teleinstruction allows a special interest class to be convened and communicated across town or across country on a secure channel if needed. Large, international companies use teleinstruction to train their sales forces that are physically located at various cities throughout the world. Traditional teleinstruction has not permitted individual students to communicate in real-time with the instructor, except as a member of a single site with a common audio channel.

There is a need for a system for remote distance education that permits an instructor to be informed of which students at remote sites wish to speak and to enable students desiring to speak to the instructor to have an individual audio channel communicating back to the instructor's studio facility.

What is needed is a system for remote distance education that permits an instructor to see which students at remote sites wish to speak and to enable a selected student to have an individual audio channel back to the instructor's studio facility. The communication both ways must be free of echoes that can confuse the listeners and reduce user satisfaction with the learning environment.

SUMMARY OF THE PRESENT INVENTION

It is therefore an object of the present invention to provide a convenient and efficient way to enable echo-free voice communications.

It is a further objective of the present invention to provide a site controller for both a student's data and voice to be communicated back to an instructor's studio facility.

It is a further object of the present invention to allow a number of response keypad terminals to be interconnected in a simple daisy chain that provides power, audio and computer communications in one cable.

It is a still further object of the present invention to provide a high quality, relatively noise-free audio channel from each of a string of student response keypad terminals connected to a single site controller.

Briefly, a site controller, according to an embodiment of the present invention, comprises a microcomputer with a RAM for main memory and an EPROM for program memory, an interface to accept RS-485 and voice communication on respective differential wire pairs from a daisy chain of student response keypad terminals, a public telephone data access arrangement with a hybrid for sending and receiving voice, a universal asynchronous receiver-transmitter for data communication by modem with a remote host site via an X.25 PAD, and an audio processor for half-duplex communication between an instructor and a student. The audio processor has voltage controlled amplifiers and side chain devices for reducing audio amplifier gain during periods of silence in order to eliminate feedback howl and adjustable delay and threshold devices for gating the respective channels through in the half-duplex mode.

An advantage of the present invention is that a communications link is provided between an instructor and a student that is free from feedback howl and satellite path induced echoes.

Another advantage of the present invention is that a system is provided in which the audio channels from each student response keypad unit in a daisy chain are relatively free from noise in spite of the close proximity of digital noise on adjacent RS-485 communication pairs.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENT

Figure 1:
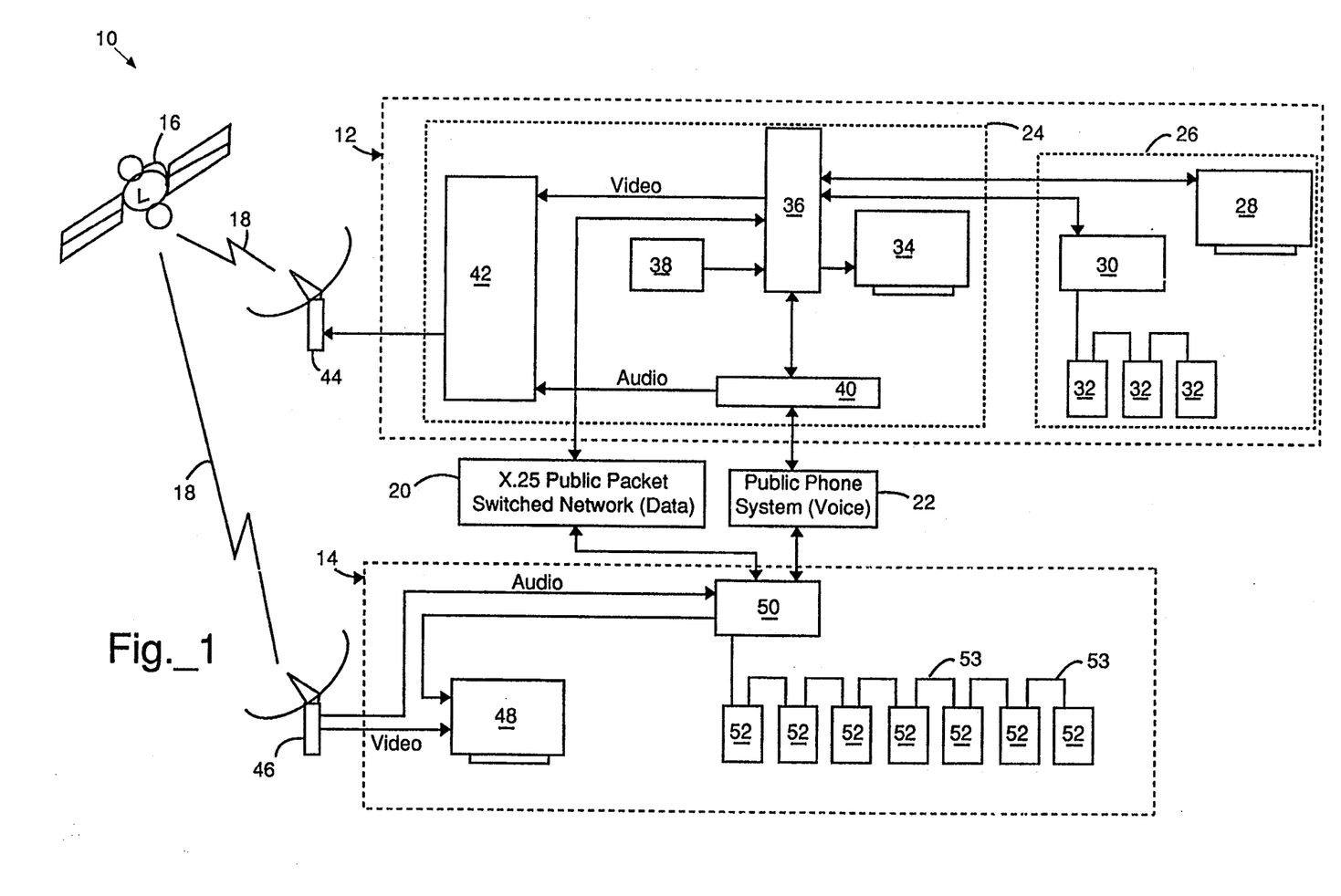
FIG. 1 is a block diagram of an instruction system having a studio site for an instructor and a remote site for a number of students which are interconnected by a satellite video channel and an audio channel through the public phone network.

FIG. 1 illustrates a remote instruction system 10 comprising a host site 12 and at least one remote site 14. A satellite 16 establishes a first communication channel 18 between sites 12 and 14. A second communications channel 20 includes the X.2.5 public packet switched network for data. A third communications channel 22 includes the public phone system direct distance dialed (DDD) network for voice communications. Host site 12 is a broadcast studio having a production control room 24 and a studio 26 for an instructor. The studio 26 includes a touch monitor 28, a site controller 30 and a plurality of response keypad terminals 32. The control room 24 has a host computer monitor 34, a host computer 36, an uninterruptable power supply (UPS) 38, a phone controller 40 and a broadcast equipment unit 42. The system 10 may further include a satellite communications uplink 44. Remote site 14 is a classroom comprising a satellite communications downlink 46, a television monitor 48, a site controller 50, and a plurality of response keypad terminals 52 on a daisy chain cable 53. Site controllers 30 and 50 are similar, as are response keypad terminals 32 and 52.

In operation, a video image of the instructor is sent from host site 12 to each remote site 14 via communications channel 18. Data between the instructor and a plurality of students individually associated with a response keypad 52 are exchanged via communications channel 20. The voice of a selected student is communicated to the instructor via communications channel 22. A student wishing to speak to the instructor presses a button for this purpose on a respective response keypad 52. The instructor selects which, if any, student he or she wishes to enable to speak by touching an appropriate icon displayed by touch monitor 28. Host computer 36 reads the selection at touch monitor 28 and sends an enabling signal to site controller 50 via communications channel 20. A microphone within the corresponding response keypad unit 52 is connected through to cable 53 and a voice channel is opened up back to the instructor via communications channel 22. Site controller 50 dials an appropriate phone number to enable the connection of host site 12 to communications channel 22.

Figure 2:
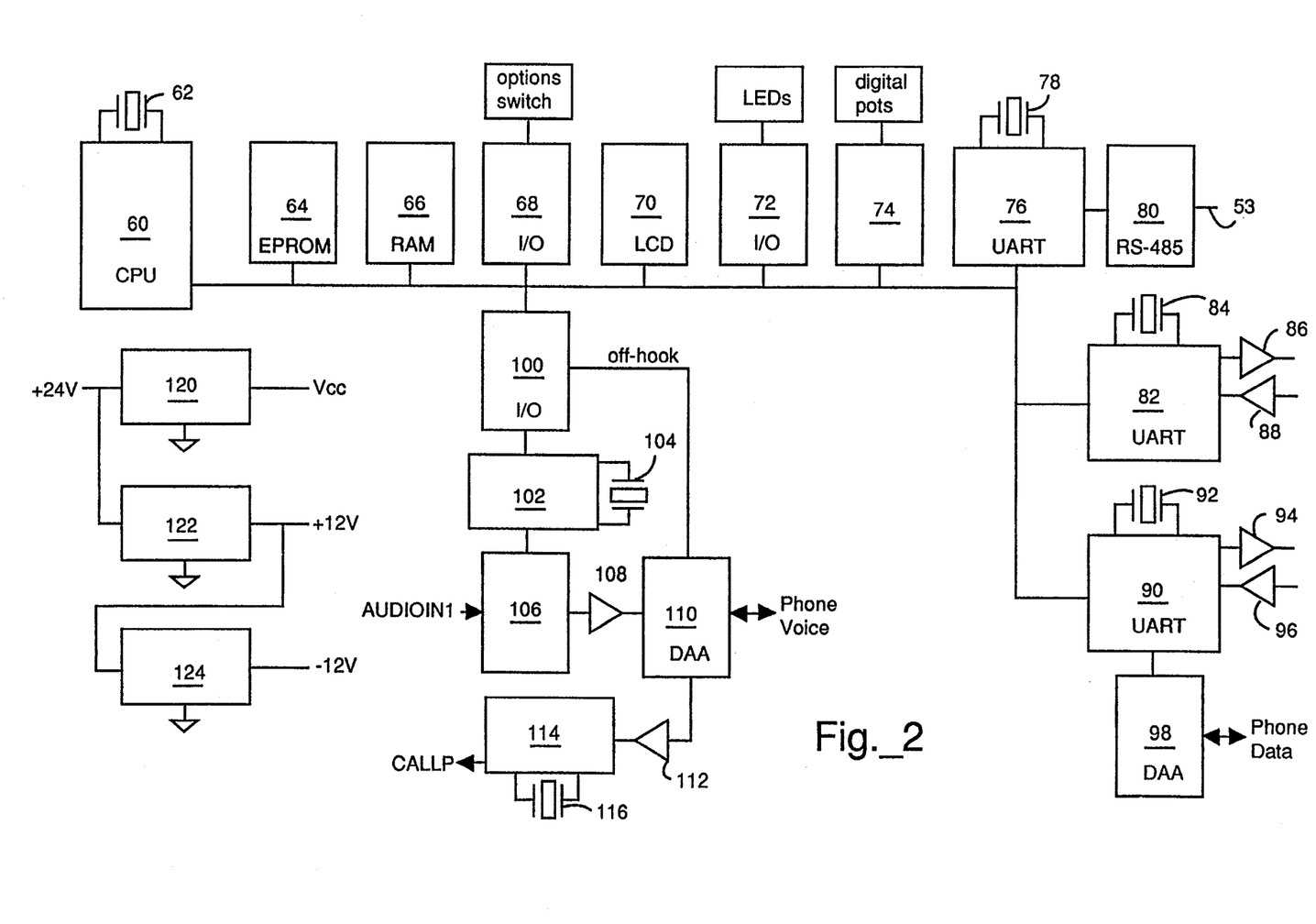
FIG. 2 is a block diagram of the site controller of FIG. 1.

FIG. 2 illustrates site controller 50, which comprises a microcomputer (CPU) 60 which may be an Intel type 80C188 tuned to a 24.00 MHz crystal 62, an erasable-programmable read-only memory (EPROM) 64 for program storage, a random access memory (RAM) 66 for data storage, an I/O port 68 for accepting dual in-line package (DIP) switch inputs, a liquid crystal display (LCD) 70 for displaying status, an I/O port 72 for driving LED panel light indicators, an I/O port 74, a universal asynchronous receiver-transmitter (UART) 76 with a 1.8432 MHz crystal 78 and an RS-485 interface 80 for communication with keypads 52 (FIG. 1), a UART 82 with a 1.8432 MHz crystal 84 and a pair of RS-232 interface buffers 86 and 88, a UART 90 with a 11.0592 MHz crystal 92 and a pair of RS-232 interface buffers 94 and 96 and an FCC approved data access arrangement (DAA) 98 for data communications. The controller 50 further includes an I/O port 100, a dual-tone multi-frequency (DTMF) tone generator 102 with a 3.58 MHz crystal 104, an analog switch 106, an amplifier 108, a data access arrangement (DAA) 110, an amplifier 112 and a type 75T980 tone decoder 114 with a 3.58 MHz crystal 116. Also, a switch-mode regulator 120 for providing logic power (Vcc), a linear regulator 122 for providing +12 VDC and a negative voltage generator 124 for providing −12 VDC are included. The Intel type 80C188 is a preferred CPU by the inventors for CPU 60 since it has an eight-bit bus, is easily expandable to sixteen-bit bus structure, will address a megabyte of memory and is reasonably inexpensive. The Intel type 80C188 has a wide range of software support since IBM PCs are code compatible and therefore has a number of compilers and developers, such as those directly available from Intel. EPROM 64 may be a pair of type 27010 devices. RAM 66 may be a pair of 628128 devices. UARTs 76 and 82 may be 73M1550 devices. RS-485 interface 80 may be a Linear Technology, Inc., type LTC485, and UART 90 a type 73K222U. The DAAs 98 and 110 are commercially available units that have been qualified by their manufacturer with the Federal Communications Commission (FCC) for direct connection to the public telephone network and are type CH1818. The use of pre-approved units simplifies gaining FCC approval under Part 68 for the whole of site controller 50. Amplifiers 108 and 112 are interconnected op-amps to form a phone hybrid that is functionally equivalent to a two-wire to four-wire telephone hybrid.

Figure 3:
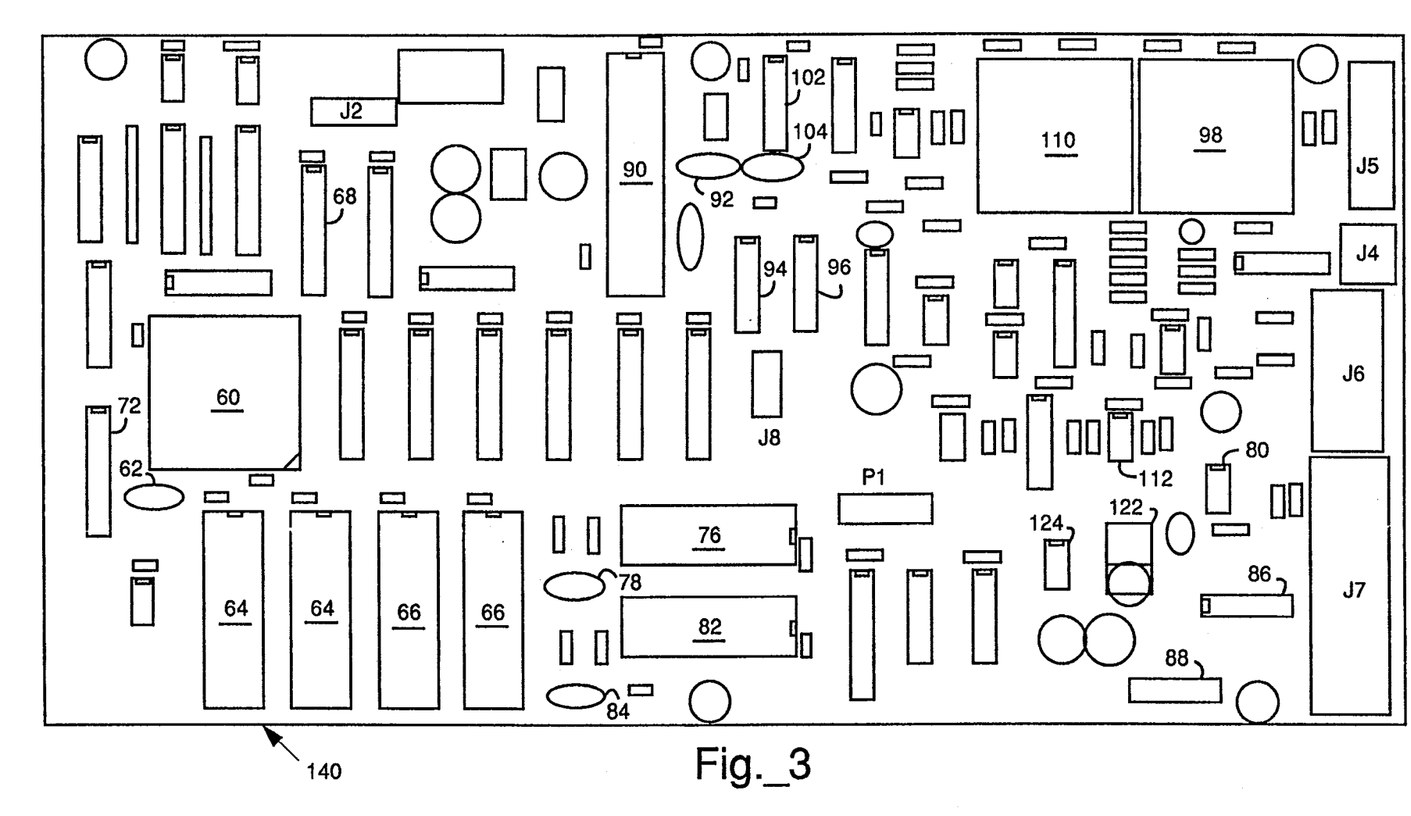
FIG. 3 is a diagram of the layout of the printed circuit assembly for the site controller circuit of FIG. 2.

FIG. 3 is the layout of a printed circuit assembly (PCA) 140 for site controller 50. Microcomputer 60, EPROMs 64 and RAMs 66 are grouped together to take advantage of signal pinouts and to make best use of the available real estate. DAAs 98 and 110 are located together at the opposite corner. Crystals that provide precise oscillator timing for various devices are located adjacent to the respective devices to keep interference with their low signal levels to a minimum. For example, crystal 62 is located next to CPU 60, crystal 78 is adjacent to UART 76 and so on.

Figure 4A:
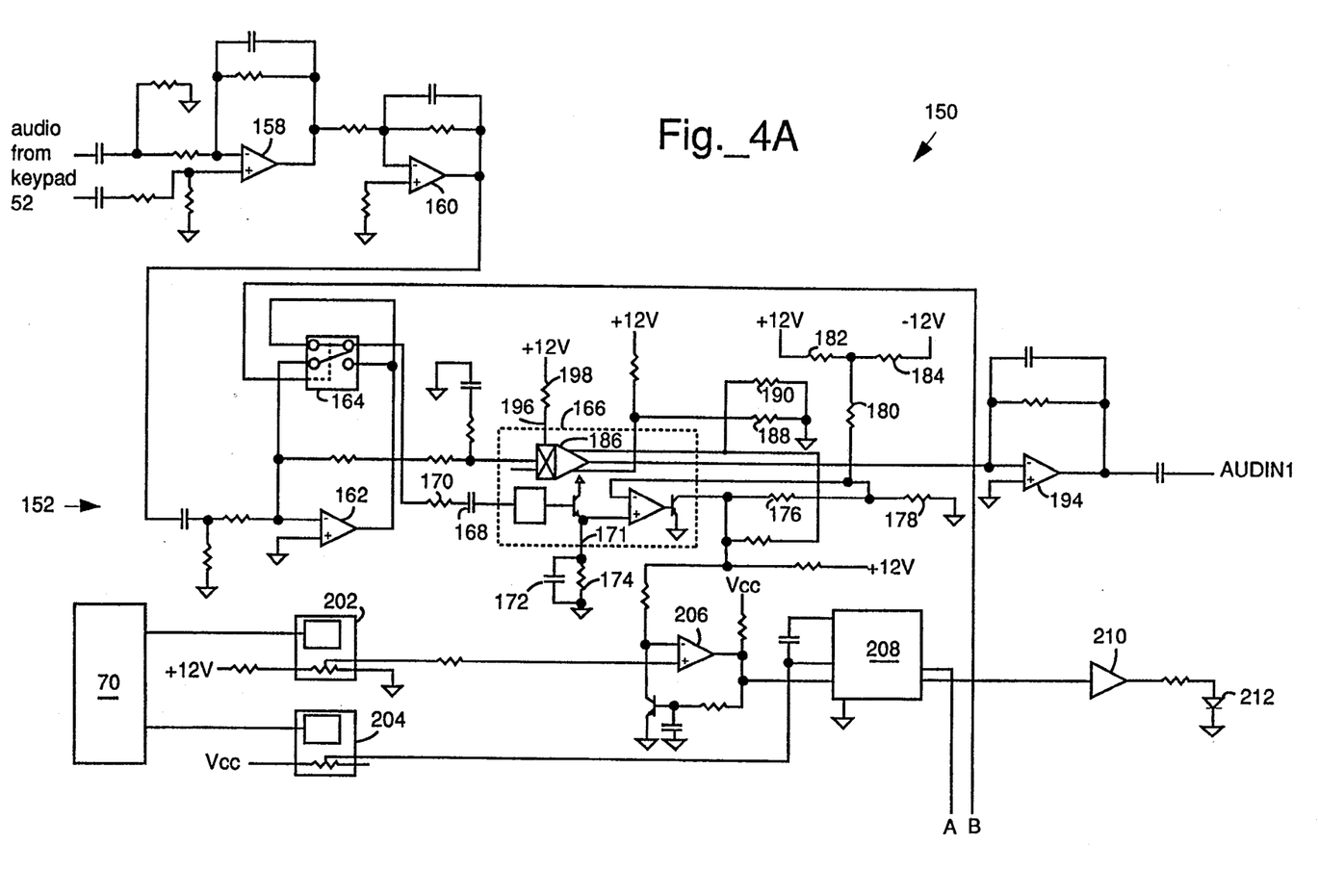
FIGS. 4A and 4B are schematic diagrams of the audio processor that attaches as a daughter board to the printed circuit assembly of FIG. 3.
Figure 4B:
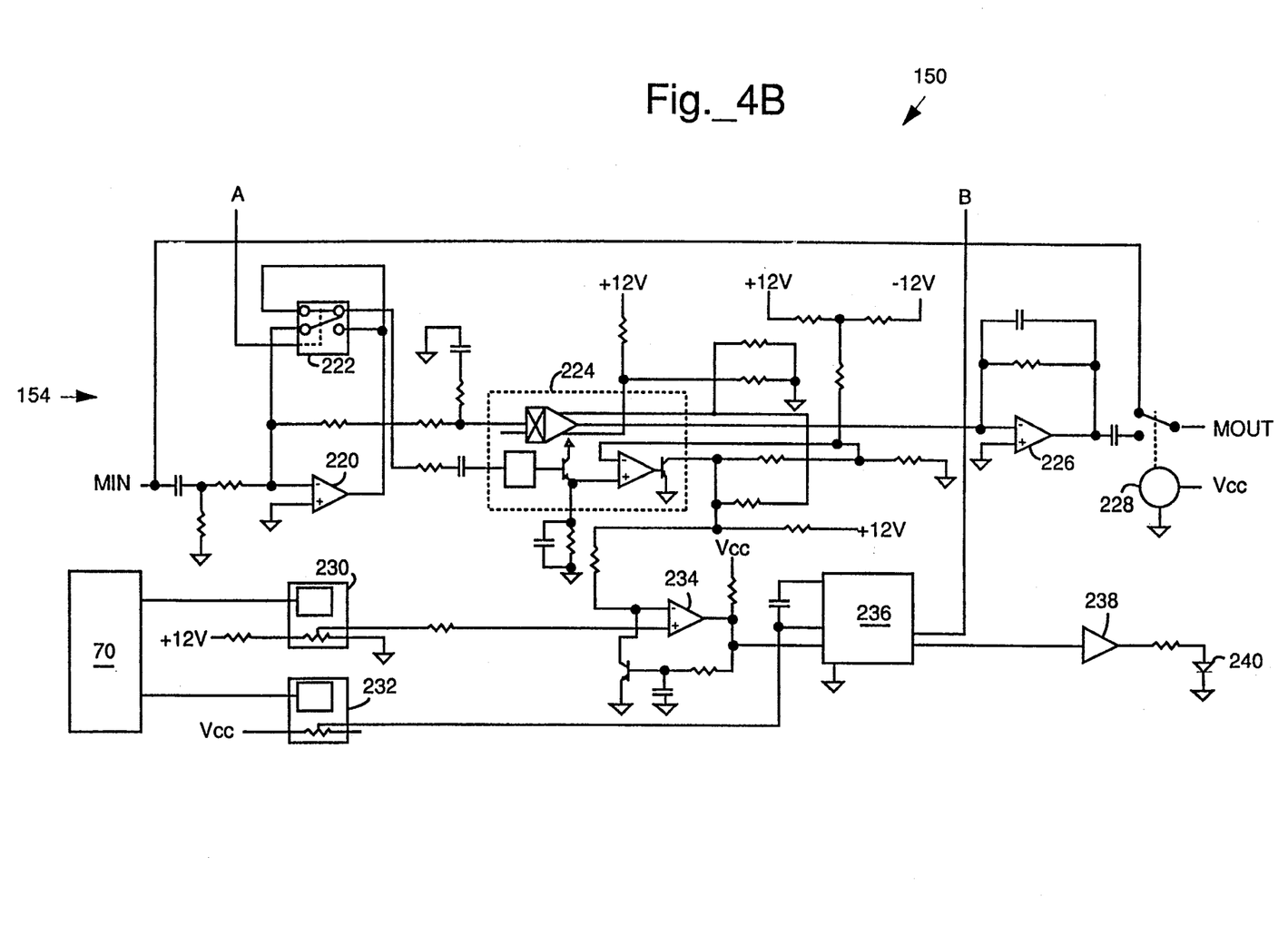

FIGS. 4A and 4B illustrate an audio processor 150 that includes a keypad noise gate and level detector channel 152 (FIG. 4A) and an instructor noise gate and level detector channel 154 (FIG. 4B). Channels 152 and 154 are both included on a board 156 (FIG. 5), which is a daughter board to PCA 140.

In operation, a differential audio signal from a microphone in a response keypad unit 52 (FIG. 1), which has been selected by an instructor at host site 12, is cabled over daisy chain 53. The signal is received by a differential input amplifier 158 and converted to a single ended signal. Amplifier 158 is configured for unity gain and the differential signal handling helps reject the introduction of electrical noise from the RS-485 digital circuits which share daisy chain 53. An amplifier 160 with a gain of sixteen increases the audio signal from a student. An op-amp 162 has an analog switch 164 that can cause the gain of op-amp 162 to drop effectively to zero. A digitally controlled audio muting function is thus provided.

A dynamic range processor 166 is used to prevent feedback howl that would otherwise result when the student voice channel through keypad noise gate and level detector 152 and the instructor voice channel through instructor noise gate and level detector 154 were both open and neither was talking. If left unchecked, the lack of a voice to amplify would be interpreted by automatic gain control (AGC) circuits as an invitation to increase gain in both channels 152 and 154. Audio processor prevents feedback howl by reducing the gain approximately ten dB in both directions. Dynamic range processor 166 is preferably a Precision Monolithics, Inc., (PMI, Santa Clara, Calif.) type SSM-2120, which has two separate control sidechain circuits, each of which have a wide dynamic range full-wave rectifier and log circuit followed by an amplifier with unipolar drive. The gain of processor 166 changes as the logarithm of the input signal amplitude. The full-wave rectifier has an input with a DC voltage of about 2.1 volts above ground and so requires a blocking capacitor 168 in series with an input resistor 170. Resistor 170 is chosen to give a ±1.5 milliamp peak input signal. When operating from a ±15 volt supply, this corresponds to a value of 10K ohms. If switch 164 is activated, the signal through resistor 170 and capacitor 168 drops to zero. The detector provides level information over a dynamic range of three milliamps to thirty milliamps, peak-to-peak, or about one hundred dB. The logarithm of this level information appears at a LOG_AV pin 171 where it is averaged with a capacitor 172. The voltage at pin 171 is no more than a few hundred millivolts above or below ground. A output transistor is run at a constant current by connecting a resistor 174. With ±15 volt supplies, a 1.5 M ohm resistor establishes a ten microamp reference current in the transistor and this is in the middle of the detector's dynamic current range (in dB). The LOG_AV pin 171 has a signal that is then buffered and amplified by the internal (to processor 166) unipolar drive op-amps. A pair of resistors 176 and 178, which are 68K ohms and 1K ohms respectively, set the gain to about sixty-eight. The threshold is fixed by a resistor 180 to the junction of a pair of resistors 182 and 184. A voltage controlled amplifier (VCA) 186 is a full class-A current-in/current-out device with complementary dB/volt gain ports. For best performance, a pair of two hundred ohm resistors 188 and 190 are tied to ground. Control sensitivity is ±6 millivolts per dB. Resistors 188 and 190 form part of an antenuator that determines the sensitivity of VCA 186 to a control voltage source. A non-linear control voltage is supplied via a resistor 192 from the side chain circuit described above. The signal inputs are virtual grounds and an output is designed to be connected to the virtual ground of the non-inverting input of an op-amp 194 which is configured as a current-to-voltage converter. The input/output current compliance range of VCA 186 is determined by the current into the reference current pin 196 set by a resistor 198. The voltage at pin 196 is about two volts above the negative supply. The current consumption of processor 166 is directly proportional to the value of resistor 198, so the value of resistor 198 is 110K ohms. With a two hundred microamp reference current, the input/output current clip point at unity gain is approximately ±400 microamps. Reference is made to U.S. Pat. Nos. 4,471,320 and 4,560,947 and PMI datasheets for further information about the theory and use of devices such as processor 166.

I/O port 70 (FIGS. 1 and 4A) controls a pair of digital potentiometers (POT) 202 and 204, which may be adjusted either locally from the front panel of site controller 50, or remotely from host site 12. Potentiometer 202 allows the microphone (GATE) threshold of a student to be set by setting a voltage level at the inverting input of an op-amp 206 which triggers a one-shot 208 according to the audio present in channel 152. When triggered, one-shot 208 is coupled to channel 154 (through connector "A" to FIG. 4B) such that channel 154 will be muted. Potentiometer 204 changes the time constant of one-shot 208 and therefore sets a delay time that muting persists after audio stops in channel 152. The objective of stretching the pulse is to allow a trigger from the trailing edge of the voice envelope. Adjusting GATE threshold down will increase the sensitivity. Adjusting the delay time down will increase the delay. A buffer 210 drives a LED 212, which may be green, to indicate channel 152 activity.

Channel 154 is illustrated in FIG. 4B and comprises an input op-amp 220 with a control switch 222 that are similar in function to op-amp 162 and switch 164. One-shot 208 controls switch 222. A processor 224 is the same as processor 166 and is, in fact, the second half of a PMI SSM-2120. The functionality is the same, only it is the instructors voice from host site 12 that is subjected to variable gain according to the amplitude of the audio signal. As explained above, feedback howl is prevented by raising the noise gate level. An op-amp 226 drives the master output (MOUT) via a bypass relay 228. I/O port 70 (FIGS. 1 and 4B) controls another pair of digital potentiometers (potentiometer) 230 and 232, which may be adjusted either locally from the front panel of site controller 50, or remotely from host site 12. Potentiometer 230 allows the microphone (GATE) threshold of an instructor to be set by setting a voltage level at the inverting input of an op-amp 234 which triggers a one-shot 236 according to the audio present in channel 154. When triggered, one-shot 236 is coupled to channel 154 (through connector "B" to FIG. 4A) such that channel 152 will be muted. Potentiometer 232 changes the time constant of one-shot 236 and therefore sets a delay time that muting persists after audio stops in channel 154. Adjusting GATE threshold down will increase the sensitivity. Adjusting the delay time down will increase the delay. Since the keypad terminal's and instructor's circuits are the same, the same settings are suitable for both. A buffer 238 drives a LED 240, preferably red, to indicate channel 154 activity.

Figure 5:
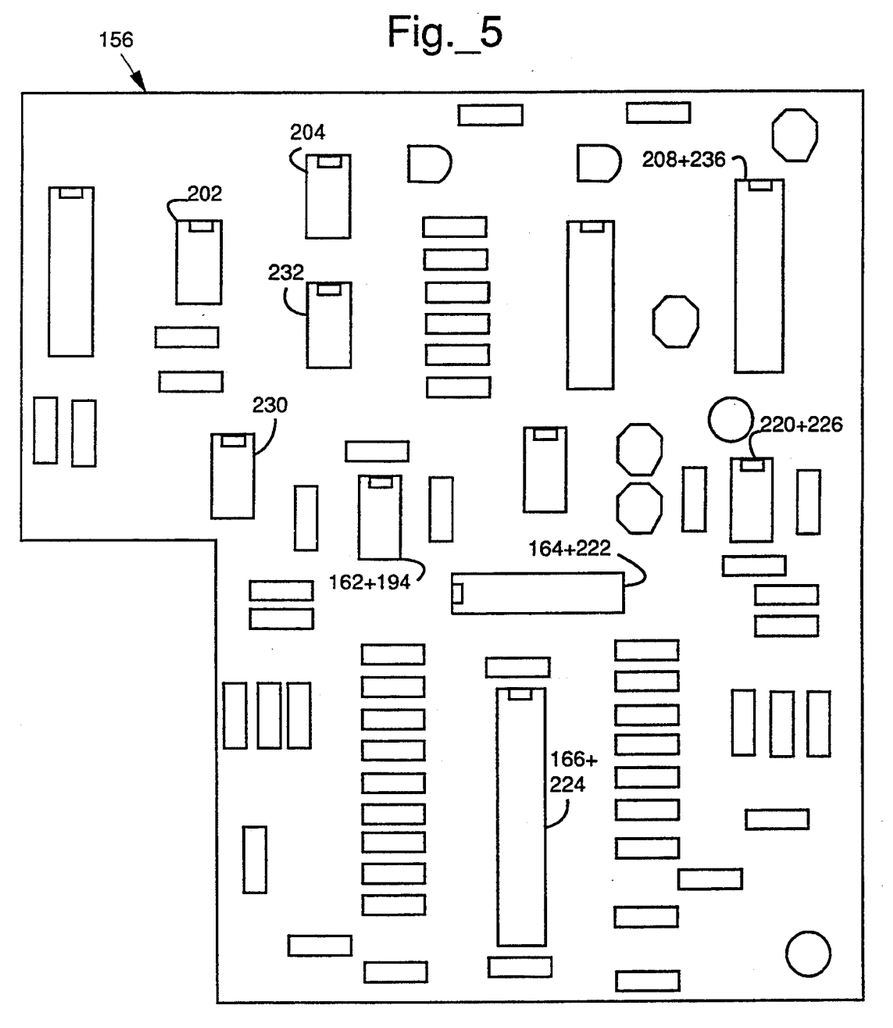
FIG. 5 is a diagram of the layout of the printed circuit assembly of the circuit of FIGS. 4A and 4B.

FIG. 5 shows daughter board 156 which is the printed circuit assembly of audio processor 150. Processors 166 and 224 share the same chip and has their respective passive components located on both sides. Switches 164 and 222 also share the same device and is adjacent to processors 166 and 224. Output amplifiers 220 and 226 are to one side and next to one-shots 208 and 236.

Return echo and feedback noises are two problems that can occur during the times when a two-way audio conversation is necessary through site controller 50, e.g., when the instructor is taking a question from a participant. Return echo has a long delay component to it. Since an instructor will typically be transmitting via satellite 16, a time delay is inserted in the instructor's voice before it will be heard at remote site 14. A student's response will be re-transmitted via satellite 16, so it could appear as an echo at the originating remote site 14. All other remote sites 14 hear only the re-transmitted signal. Feedback occurs when the audio from an instructor's and a student's microphone are live in the same room at the same time. Since the room monitor must be suppressed while the participant is speaking to prevent the echo problem, the keypad terminal's microphone must be voice activated (VOX). To prevent the room monitor from activating the keypad terminal microphone, it must be suppressed while the instructor is speaking, the two suppression circuits work together in a half duplex fashion. When a signal is present on one channel (152 or 154) the other is suppressed and the channel that is talking must stop before the other channel can turn on.

The present invention therefore also embraces a method of voice communication between a host site and a remote site in which the remote site receives voice and video of an instructor from the host site via satellite and the host site receives voice from a student over the dial-up public telephone system. Specifically the method comprises digitally transmitting a request by a student at a remote site for voice communication with an instructor at a host site. Then digitally transmitting, from the host site, a signal to enable a site controller to connect a response keypad terminal with a microphone proximate to the student through to the instructor over the dial-up public telephone network. The amplitude of a first audio signal representing the voice of the student is sensed and the amplitude of a second audio signal, representing the voice of the instructor, is also sensed. Then a gating of the first audio signal through to the host site is made if the student is speaking and the instructor is not. A gating of the second audio signal through to the remote site occurs if the instructor is speaking and the student is not. If both the student and the instructor are silent and the site controller has been enabled to connect the response keypad unit, the amplitude of both the first and second audio signals are reduced approximately ten dB to prevent feedback howl.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A voice communication system for canceling feedback howl and satellite delay echo between two remote locations interconnected by a satellite-based communications link, the system comprising:
   a first noise gate and level detector channel having a speech input connected to a first dynamic range processor with a log circuit and voltage controlled amplifier (VCA) for communicating a first audio signal from a first site to a second site via said satellite-based communications link; and
   a second noise gate and level detector channel having a speech input connected to a second dynamic range processor with a log circuit and voltage controlled amplifier (VCA) for communicating a second audio signal from said second site to said first site via said satellite-based communications link;
   wherein, the amplitude of a first voice signal is sensed in the first channel and the amplitude of a second voice signal is sensed in the second channel and such sensing is used by the first and second channels to half-duplex control a gating of said first and second voice signals through said satellite-based communications link and to adjust the amplitudes of said first and second voice signals with respective ones of said first and second VCAs.

2. The system of claim 1, further comprising:
   amplitude control means connected to each of the first and second channels for reducing the gain in both the first and second channels when both the first and second channels are quiet thereby preventing audio feedback howl.

3. The system of claim 1, further comprising:
   first silencing means connected to the first and second channels for muting the second channel when an audio signal that exceeds a minimum threshold is passing through the first channel.

4. The system of claim 1, further comprising:
   second silencing means connected to the first and second channels for muting the first channel when an audio signal that exceeds a minimum threshold is passing through the second channel; and
   lockout means connected to both the first and second silencing means for preventing the first and second silencing means from both being activated at the same time.

* * * * *